United States Patent
Horst et al.

(10) Patent No.: US 8,670,854 B2
(45) Date of Patent: Mar. 11, 2014

(54) METHOD FOR MONITORING SEQUENCING OF A CONTROL RECIPE FOR A BATCH PROCESS

(75) Inventors: Andre Horst, Karlsruhe (DE); Christophe Richard, Seltz (FR)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 13/149,572

(22) Filed: May 31, 2011
(Under 37 CFR 1.47)

(65) Prior Publication Data
US 2011/0295406 A1    Dec. 1, 2011

(30) Foreign Application Priority Data
May 31, 2010    (EP) .................................... 10164524

(51) Int. Cl.
*G06F 19/00*    (2011.01)
(52) U.S. Cl.
USPC ............................................ 700/98; 700/121
(58) Field of Classification Search
USPC ................................ 700/98, 108, 121; 438/10
See application file for complete search history.

(56) References Cited

U.S. PATENT DOCUMENTS

| | | | |
|---|---|---|---|
| 6,427,093 B1 * | 7/2002 | Toprac ........................... | 700/121 |
| 6,907,308 B1 * | 6/2005 | Bartlett et al. ................. | 700/121 |
| 6,937,753 B1 * | 8/2005 | O'Dell et al. .................. | 382/141 |
| 7,123,980 B2 * | 10/2006 | Funk et al. ..................... | 700/121 |
| 7,652,567 B2 | 1/2010 | Murayama et al. | |
| 2007/0172018 A1 | 7/2007 | Murayama et al. | |
| 2008/0071490 A1 | 3/2008 | Nakamura | |
| 2008/0255681 A1 | 10/2008 | Scott et al. | |
| 2009/0082881 A1 | 3/2009 | Awata et al. | |
| 2010/0004759 A1 | 1/2010 | Scott et al. | |

FOREIGN PATENT DOCUMENTS

| | | |
|---|---|---|
| CN | 101004850 | 7/2007 |
| CN | 101149606 | 3/2008 |
| CN | 101286068 | 10/2008 |
| EP | 1 811 354 | 7/2007 |

OTHER PUBLICATIONS

Siemens-Katalog "ST PCS 7—Feb. 2010", SIMATIC PCS 7, Chapter 10.

* cited by examiner

*Primary Examiner* — Kidest Bahta
(74) *Attorney, Agent, or Firm* — Cozen O'Connor

(57) ABSTRACT

A method for monitoring sequencing of a control recipe for a batch process, wherein the recipe comprises a plurality of recipe elements and is displayable on a display unit of a batch or operator system. In order to simplify the monitoring of the sequence of the control recipe a respective recipe-element-specific rule is created for each of the plurality of recipe elements, compliance with the respective recipe-element-specific rule is monitored for each of the plurality of recipe elements during run-time of the control recipe, each recipe element of the plurality of recipe elements is automatically classified into one of a plurality of problem levels if the respective recipe-element-specific rule for a respective recipe element of the plurality of recipe elements is not complied with, and recipe elements of the plurality of recipe elements that have been classified are displayed, together with the respective problem level, on the display unit in tabular form.

4 Claims, 4 Drawing Sheets

| Status | Starting | | Running | Paused | | Stopping | |
|---|---|---|---|---|---|---|---|
| Symbol | ▷ | | ▶ | ⏸ | | ⏹ | |
| Recipe element | RUP [1] | T [34] | xxx | T [12] | RUP [3] | ROP [2] | xxx | xxx |
| Problem level "note" after | 10 Seconds | 2 Seconds | --- | 5 Seconds | 30 Seconds | 2 Seconds | 10 Seconds | 2 Seconds |
| Problem level "warning" after | 20 Seconds | 5 Seconds | --- | 10 Seconds | 1 Minute | 5 Seconds | 30 Seconds | 5 Seconds |
| Problem level "critical" after | 1 Minute | 10 Seconds | --- | 30 Seconds | 5 Minutes | 10 Seconds | 1 Minute | 10 Seconds |

FIG 1

| Status | Starting | | Running | | Paused | | Stopping | |
|---|---|---|---|---|---|---|---|---|
| Symbol | △ | | ▲ | | ▯▯ | | ▽ | |
| Recipe element | RUP [1] | T [34] | xxx | T [12] | RUP [3] | ROP [2] | xxx | xxx |
| Problem level "note" after | 10 Seconds | 2 Seconds | --- | 5 Seconds | 30 Seconds | 2 Seconds | 10 Seconds | 2 Seconds |
| Problem level "warning" after | 20 Seconds | 5 Seconds | --- | 10 Seconds | 1 Minute | 5 Seconds | 30 Seconds | 5 Seconds |
| Problem level "critical" after | 1 Minute | 10 Seconds | --- | 30 Seconds | 5 Minutes | 10 Seconds | 1 Minute | 10 Seconds |

FIG 2

| Description | Reserve subsystem | Reserve equipment | Timeout | Breakpoint | ESig | Subsystem reservation required | User intervention required | Fault |
|---|---|---|---|---|---|---|---|---|
| Symbol | ⌣ | ⌒ | 🕒 | ● | ⊘ | ● | ◔ | ↯ |
| Problem level "note" after | 10 Seconds | 10 Seconds | 5 Seconds | 0 Seconds | 0 Seconds | 0 Seconds | 0 Seconds | --- |
| Problem level "warning" after | 1 Minute | 1 Minute | 30 Seconds | 5 Minutes | 1 Minute | 1 Minute | 10 Minutes | --- |
| Problem level "critical" after | 10 Minutes | 10 Minutes min. | 1 Minute | 10 Minutes | 10 Minutes | 10 Minutes | 15 Minutes min. | 0 Seconds |

FIG 3

| | Category | Recipe element | Run time | status | Comment |
|---|---|---|---|---|---|
| 1 | Critical | RUP [1] | 1 02:05:54 | | Subsystem reservation not possible |
| 2 | Critical | T34 [56] | 00:10:23 | | Transition has not yet ended |
| 3 | Critical | Metering [4] | 00:00:12 | | Recipe element in the fault state |
| 4 | Warning | T12 [22] | 00:34:00 | | Breakpoint not acknowledged |
| 5 | Warning | RUP [3] | 00:01:02 | | Subsystem not yet reserved |
| 6 | Note | Opd [42] | 00:24:57 | | Operator dialog not yet acknowledged |
| 7 | Note | ROP [2] | 00:45:00 | | Recipe operation is taking too long |
| 8 | Note | RUP [7] | 00:00:15 | | Still no subsystem selected |

METHOD FOR MONITORING SEQUENCING OF A CONTROL RECIPE FOR A BATCH PROCESS

BACKGROUND OF THE INVENTION

1. Field of the Invention

The invention relates to batch processing and more particularly, to a method for monitoring sequencing of a control recipe for a batch process, where the recipe comprises recipe elements and is displayable on a display unit of an operator or batch system. In addition, the invention relates to an arrangement having an operator and a batch system that is configured to implement the method.

2. Description of the Related Art

A conventional computer program for implementing a method for monitoring the sequence of a control recipe for a batch process that is displayable on a display unit of an operator or a batch system is disclosed in Siemens catalog "ST PCS 7—March 2010", SIMATIC PCS 7, chapter 10. As disclosed therein, a user graphically creates a recipe for controlling a batch process on the display unit using "BATCH Software" that can be executed on a programming unit. During a control operation, during which the recipe is sequentially processed by a batch system, where an automation unit that is connected to the batch system online correspondingly respectively processes, for each recipe phase, a functional module assigned to this recipe phase, an operator monitors the recipe sequence using an operator system. For this purpose, the operator follows and monitors the recipe that is graphically displayed on a display unit of the operator system to detect disturbances and problems while controlling the batch process, where individual recipe elements are indicated using particular states. Generally, these particular states do not indicate potential problems but rather indicate—if anything—only specific faults or disturbances reported to the operator system by the hardware of the automation unit. In order to detect possible problems in the overall sequence, such as failure of a loop in the recipe sequence to end because particular characteristic variables are not reached, the operator must always have an overview of the entire recipe. If the control recipes are complex and are also nested, then it is increasingly difficult to continuously follow the sequence.

In addition, a recipe sequence often has recipe elements that require intervention by the operator. Such an intervention, such as selecting a subsystem, a breakpoint acknowledgement or a dialog confirmation, can only be directly performed by the operator within a complete overview of the recipe by a corresponding operation on the recipe element. If a plurality of events requiring operator intervention occur at the same time, the operator quickly loses the overview of the recipe sequence. Furthermore, the operator can overlook required operator intervention, which may result in disturbances in control operation over a relatively long period of time.

SUMMARY OF THE INVENTION

It is therefore an object of the present invention to provide a method for monitoring sequencing of a control recipe for a batch process that is displayable on a display unit of an operator or a batch system that is used to simplify the monitoring of the sequence of the control recipe. It is also an object of the invention to provide an arrangement having an operator and a batch system that is configured to implement the method.

These and other objects and advantages are achieved in accordance with invention by a method and apparatus, where a recipe-element-specific rule is respectively created for a plurality of recipe elements, compliance with the recipe-element-specific rule is monitored for each of the plurality of recipe elements during run time of the control recipe, each recipe element of the plurality of recipe elements is automatically classified into one of a plurality of problem levels if the recipe-element-specific rule for the respective recipe element is not complied with, and the plurality of recipe elements that have been classified are displayed, together with the respective problem level, on the display unit in tabular form.

It is advantageous that an operator is quickly informed of disturbances and/or required intervention and can initiate corresponding measures.

In an embodiment of the invention, at least one of the recipe elements that have been classified is reclassified into another problem level in a time-controlled manner. As a result, it becomes possible to easily assign a higher-priority problem level to a recipe element that is initially assigned a low-priority problem level. Here, the recipe element with this higher-priority problem level is displayed on one of the upper rows of a table to quickly make the operator aware of the more critical classification.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawings that illustrate an exemplary embodiment of the invention, in which:

FIGS. 1 and 2 show classification tables in accordance with the invention;

FIG. 3 shows a tabular illustration of recipe elements in accordance with the invention;

DETAILED DESCRIPTION OF THE PRESENTLY PREFERRED EMBODIMENTS

Figure 4:
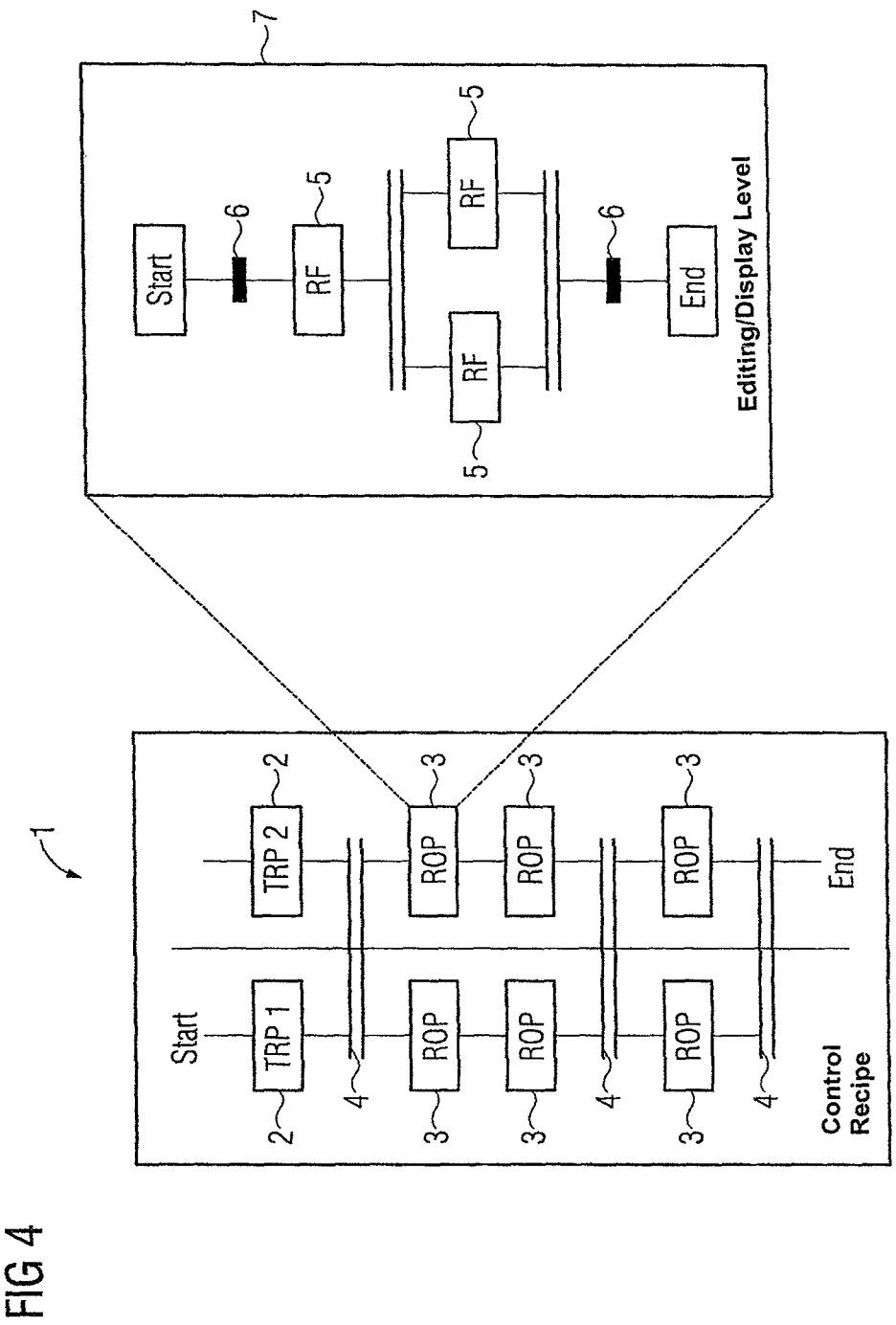
FIG. 4 shows an illustration of a control recipe in accordance with the invention.

With initial reference to FIG. 4, which illustrates a control recipe 1 (e.g., a recipe procedure), shown therein is a batch process in a manner known per se on a display unit of a batch or operator system. The control recipe 1 that is created by a user on an engineering system using suitable batch software is intended to control a process or production in a system. The control recipe 1 has a plurality of partial recipe procedures 2 that each control a subprocess or a process stage in a subsystem. Each of these partial recipe procedures 2 has a multiplicity of recipe operations 3 (ROP) and a multiplicity of parallel branches 4, each of these recipe operations 3, such as a "heating" and "mixing" recipe operation, in turn can comprise a multiplicity of recipe operations and/or recipe functions (RF) 5 and transitions 6, which is indicated in FIG. 4 by the illustration of a further editing or display level 7. It should be appreciated that the control recipe 1 may comprise further parts, such as synchronization lines, loops, operator instructions or alternative branches. These recipe operations and/or recipe functions are operatively connected to suitable hardware and software components of an automation unit or an automation device. Here, during the control operation, the control recipe 1 is sequentially processed by the batch system and an automation unit or units which is/are connected to the batch system online respectively correspondingly process (es), for each recipe operation or function, a functional module assigned to this operation or function. During a control operation, an operator monitors the sequence of the control recipe 1 using the operator system, where the operator follows and monitors the control recipe 1 on the display unit to detect disturbances and problems while controlling the batch process.

In order to better monitor the sequence of a control recipe and to be able to detect disturbances in a simpler manner, monitoring software running on the batch or operator system monitors all recipe elements of the control recipe with respect to their respective states, run times, instances in which run times are exceeded, the number of executions as well as state transitions and the duration of the state transitions, where the monitoring software compares this information with recipe-element-specific rules that are created by the user using the batch software and are stored by the user in a list in the batch system. Here, the term "recipe element" should be understood to mean parts of the control recipe, such as partial recipe procedures, recipe operations, recipe functions and transitions or operator dialogs.

In this respect, the following terms are used below, in particular in the figures:
RUP (Recipe Unit Procedure) for a partial recipe procedure,
ROP (Recipe Operation) for a recipe operation,
RF (RPH, Recipe Phase) for a recipe function,
T for a transition, and
Opd for an operator dialog.

The recipe-element-specific rules can relate to a basic state, a reservation state and/or an adaptive or extended state identifier. A basic state of a "heating" or "metering" recipe element comprises, for example, a "starting", a "running", a "paused" or a "stopping" state. Reservation states can be understood as meaning, for example, "subsystem reserved for the execution of a partial recipe procedure" or "controller or automation unit is reserved by a recipe operation". "Reserve subsystem" (in order to be able to execute the associated partial recipe procedure), "perform electronic signing" or "fault state", for example, are provided as the extended state identifiers of a recipe element.

The following exemplary recipe-element-specific rules, compliance with which is monitored by the monitoring program, are provided:
a partial recipe procedure of a subsystem is not executed within a particular period of time (for example, because the controller or the automation unit has not reserved the subsystem or the connection between the batch or operator system and the controller has been interrupted),
an operator dialog is not acknowledged within a particular period of time,
a transition has not yet ended after a particular period of time (for example, because a breakpoint has not yet been acknowledged),
a recipe operation has not yet ended after a particular period of time (for example, because one or more recipe phases have not been performed quickly enough, for example, the speed of a motor could not be reached in the expected time).

If, for example, a partial recipe procedure for a subsystem is not ended within a period of time, such as 10 seconds, after the expected execution duration, the monitoring program initially classifies this partial recipe procedure into a low-priority problem level "note". If this partial recipe procedure has still not yet been ended after a period of time, such as 1 minute, the monitoring program is used to automatically reclassify the recipe procedure into a higher-priority problem level "warning" and, finally, if this partial recipe procedure has also not yet been ended after a period of time, such as 10 minutes, into a problem level with the highest priority "critical".

The recipe elements which have been classified with the problem levels are displayed, with the associated problem levels "note", "warning" and "critical", in a table on the display unit of the batch or operator system, where the table is sorted according to the problem levels "critical", "warning" and "note" that have been classified.

It should be appreciated that it is possible to provide more than three problem levels. Classification according to the three above-mentioned problem levels usually suffices.

It is generally true for the problem level "note" that an operator should be made aware if the monitoring program discovers an irregularity or if the monitoring program detects required operator intervention. As a result, it is possible for the operator to detect possible problems and/or to intervene at an early point in time.

It is generally true for the problem level "warning" that this level is substantially preceded by a previous note that is not heeded any further beyond a defined or predefined time and/or the conflict or problem has not yet been resolved, such a partial recipe procedure has still not yet reserved its corresponding subsystem after a predetermined time period, such as 1 minute, or a breakpoint has been pending for more than a predetermined time period, such as half an hour.

The problem level "critical" is provided for all recipe elements that are in the fault state. In addition, this problem level is provided for the recipe elements which have been classified with the problem level "warning" and have not been heeded for a defined or predefined time and the conflict or problem therefore still exists, such as a transition that has already been classified with the problem level "warning" and has still not yet been ended even after a time period of 10 minutes or a subsystem that has already been classified with the problem level "warning" could not be reserved for some time. In these cases, reclassification into the problem level "critical" is then performed automatically.

In a table that is inconclusive, FIG. 1 and FIG. 2 show classifications of recipe elements into problem levels, where classification is performed using recipe elements and their state in FIG. 1 and classification of recipe elements is performed using an adaptive or extended state identifier in FIG. 2. The three problem levels "note", "warning" and "critical" are provided in both tables, where different recipe elements have different times for automatic reclassification into another problem level, such as from the problem level "warning" into the problem level "critical".

FIG. 3 shows a tabular illustration of recipe elements with associated problem levels that have been created by the monitoring program based on recipe-element-specific rules and the monitoring of all recipe elements of a control recipe with regard to their respective states, run times, instances in which run times are exceeded, the number of executions as well as state transitions and the duration of the state transitions, and are displayed by the monitoring program on a display unit of an operator or batch system. For each recipe element illustrated in a column, the problem levels "critical", "warning"

and "note" are illustrated in a further column, the recipe elements which have been classified "critical" and require increased attention by an operator being entered in the uppermost rows of the table. These recipe elements are followed by the recipe elements that have been assigned the classification "warning". Lastly, the lowermost rows list the low-priority recipe elements that have been classified in the problem level "note". The extended state identifiers are also entered in the column "recipe elements" and are additionally illustrated in a column "status" for better clarity. In addition, the operator gathers further information, which indicates how long the recipe elements have already been active, from a column "run time". A further column "comments" displays notes on the respective problem to the operator. On account of this information, the operator is quickly informed of disturbances and/or required intervention and can initiate corresponding measures.

Figure 5:
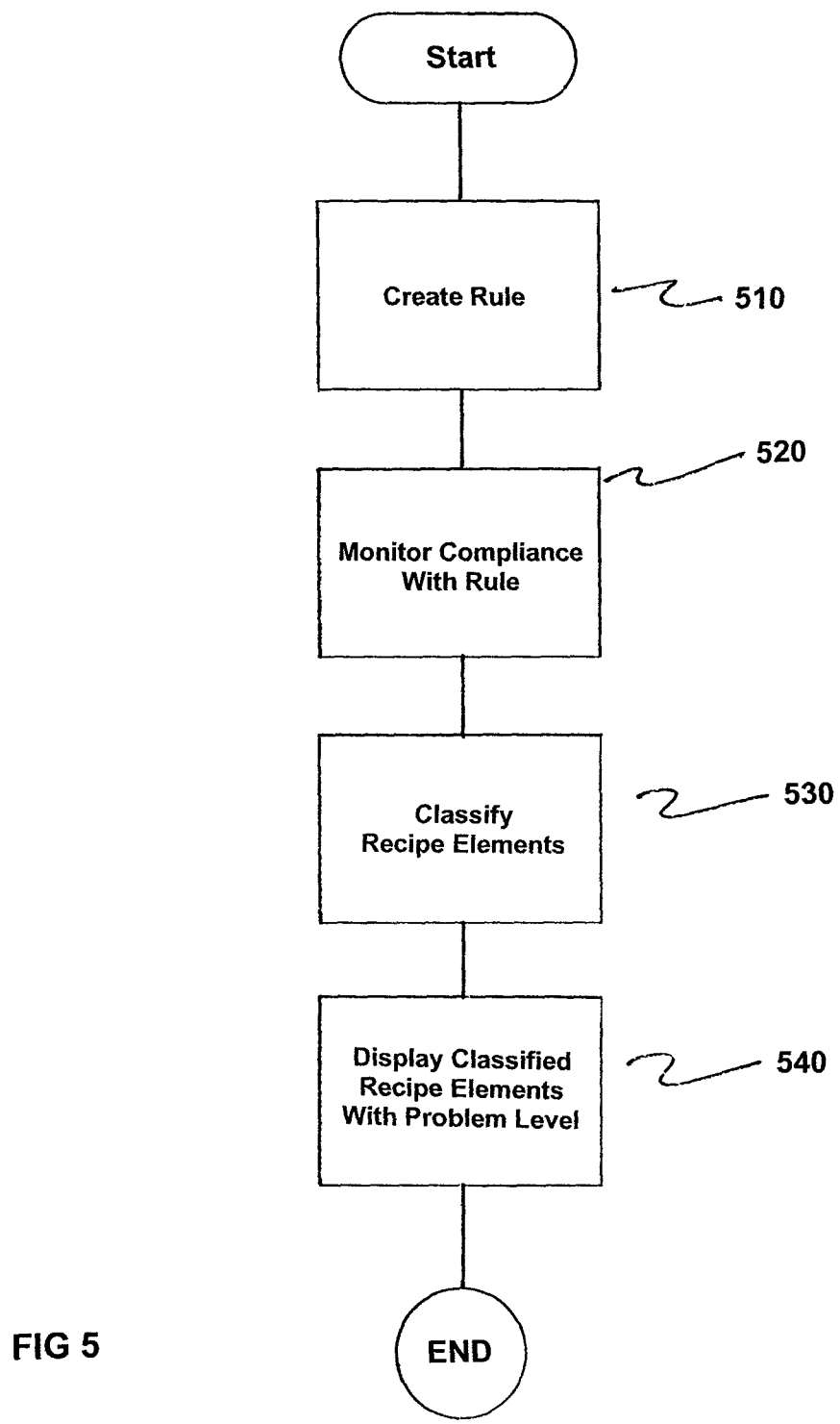
FIG. 5 is a flow chart of the method in accordance with an embodiment of the invention.

FIG. 5 is a flow chart of the method in accordance with an embodiment of the invention. The method comprises creating a respective recipe-element-specific rule for each of the plurality of recipe elements, as indicated in step 510. Compliance with the created respective recipe-element-specific rule is monitored for each of the plurality of recipe elements during run-time of the control recipe, as indicated in step 520. Each recipe element of the plurality of recipe elements is automatically classified into one of a plurality of problem levels if the recipe-element-specific rule for the respective recipe element is not complied with, as indicated in step 530. Each classified recipe element of the plurality of recipe elements is displayed, together with the respective problem level, on the display unit in tabular form, as indicated in step 540.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for monitoring the sequence of a control recipe for a batch process, the recipe comprising a plurality of recipe elements and being displayable on a display unit of an operator or a batch system, the method comprising:

creating, by a processor including memory, a respective recipe-element-specific rule for each of the plurality of recipe elements of the control recipe for a batch process;

monitoring, by the processor including the memory, compliance with the respective recipe-element-specific rule for each of the plurality of recipe elements during run-time of the control recipe for the batch process;

classifying automatically, by the processor including the memory, each of the plurality of recipe elements of the control recipe for the batch process into one of a plurality of problem levels if the respective recipe-element-specific rule for a respective recipe element of the plurality of recipe elements of the control recipe for the batch process is not complied with; and displaying each of the classified plurality of recipe elements, together with a respective problem level of the plurality of problem levels, on the display unit in tabular form.

2. The method as claimed in claim 1, further comprising:

reclassifying at least one of the classified plurality of recipe elements into another problem level in a time-controlled manner.

3. An arrangement having an operator and a batch system provided with a computer program which, during execution and in operative connection with an automation unit, controls a control recipe for a batch process, the control recipe comprising a plurality of recipe elements and being displayable on a display unit of the operator or batch system, the computer program or a monitoring program of the batch system comprising:

program code for creating, by a processor including memory, a respective recipe-element-specific rule for each of the plurality of recipe elements of the control recipe for a batch process;

program code for monitoring, by the processor including the memory, compliance with the respective recipe-element-specific rule for each of the plurality of recipe elements during run-time of the control recipe for the batch process;

program code for classifying automatically, by the processor including the memory, each of the plurality of recipe elements of the control recipe for the batch process into one of a plurality of problem levels if the respective recipe-element-specific rule for a respective recipe element of the plurality of recipe elements of the control recipe for the batch process is not complied with; and program code for displaying the classified recipe elements of the plurality of recipe elements, together with a respective problem level, on the display unit of the operator system in tabular form.

4. The arrangement as claimed in claim 3, wherein one of the computer program and the monitoring program includes program code for reclassifying at least one of the plurality of recipe elements that have been classified into another problem level in a time-controlled manner.

* * * * *